US012806985B2

(12) United States Patent
Karlsson et al.

(10) Patent No.: US 12,806,985 B2
(45) Date of Patent: Nov. 24, 2026

(54) FRAME FOR A TRACTION BATTERY ASSEMBLY OF A VEHICLE, TRACTION BATTERY ASSEMBLY FOR A VEHICLE, VEHICLE, AND METHOD FOR PRODUCING A FRAME FOR A TRACTION BATTERY ASSEMBLY OF A VEHICLE

(71) Applicant: Volvo Car Corporation, Gothenburg (SE)

(72) Inventors: Daniel Karlsson, Gothenburg (SE); Ana Magalhães, Gothenburg (SE); Per Nordenström, Gothenburg (SE)

(73) Assignee: Volvo Car Corporation, Gothenburg (SE)

( * ) Notice: Subject to any disclaimer, the term of this patent is extended or adjusted under 35 U.S.C. 154(b) by 270 days.

(21) Appl. No.: 18/616,609

(22) Filed: Mar. 26, 2024

(65) Prior Publication Data

US 2024/0326570 A1 Oct. 3, 2024

(30) Foreign Application Priority Data

Mar. 27, 2023 (EP) .................................... 23164394

(51) Int. Cl.
*B60K 1/04* (2019.01)
*B23K 20/12* (2006.01)
(Continued)

(52) U.S. Cl.
CPC .............. *B60K 1/04* (2013.01); *B23K 20/129* (2013.01); *B62D 25/20* (2013.01);
(Continued)

(58) Field of Classification Search
CPC .. B60K 1/04; B60K 2001/0438; B62D 25/20; H01M 50/242; B60L 50/64; B23K 20/1265; B23K 20/122; B23K 20/129
(Continued)

(56) References Cited

U.S. PATENT DOCUMENTS 10,576,836 B2 * 3/2020 Ruech ...................... B60K 1/04
10,703,186 B2 * 7/2020 Ruech ..................... B60L 50/64
(Continued)

FOREIGN PATENT DOCUMENTS

JP 2018037268 A * 3/2018
JP 7209528 B2 1/2023

OTHER PUBLICATIONS

English Translation of JP2018037268 retrieved from PE2E Translation 2026 (Year: 2018).*
(Continued)

*Primary Examiner* — Jason D Shanske
*Assistant Examiner* — Caitlin Anne Miller
(74) *Attorney, Agent, or Firm* — Amin, Turocy & Watson, LLP

(57) ABSTRACT

The disclosure relates to a frame for a traction battery assembly of a vehicle. The frame comprises at least a first beam component and a second beam component, wherein the first beam component and the second beam component are connected via a friction stir weld seam. The weld seam has at least one curved section. Additionally, a traction battery assembly for a vehicle is presented. The traction battery assembly comprises such a frame and at least one battery cell being arranged inside the frame. The at least one battery cell is connected to the first beam component and/or to the second beam component via an adhesive component. Moreover, a vehicle is shown. The vehicle comprises a traction battery assembly, wherein the traction battery assembly is a structural floor component of the vehicle. Furthermore, a method for producing a frame for a traction battery assembly of a vehicle is explained.

20 Claims, 3 Drawing Sheets

(51) Int. Cl.
*B23K 101/00* (2006.01)
*B62D 25/20* (2006.01)
*H01M 50/249* (2021.01)

(52) U.S. Cl.
CPC ..... *H01M 50/249* (2021.01); *B23K 2101/006* (2018.08); *B60K 2001/0438* (2013.01); *H01M 2220/20* (2013.01)

(58) Field of Classification Search
USPC .......................................................... 180/68.5
See application file for complete search history.

(56) References Cited

U.S. PATENT DOCUMENTS

| | | | | |
|---|---|---|---|---|
| 11,031,649 B2 * | 6/2021 | Hilfrich | .............. | H01M 50/244 |
| 11,538,505 B1 * | 12/2022 | Coffey | ............... | B23K 20/1225 |
| 11,772,192 B2 * | 10/2023 | Handing | ................ | B23K 26/21 180/68.5 |
| 2019/0100090 A1 * | 4/2019 | Matecki | .............. | H01M 50/204 |
| 2021/0273285 A1 * | 9/2021 | Bluemel | ................. | B60L 58/27 |
| 2023/0286073 A1 * | 9/2023 | Choi | .................... | B23K 9/0026 |
| 2024/0106076 A1 * | 3/2024 | Erb | ................... | H01M 10/6554 |

OTHER PUBLICATIONS

Extended European Search Report received for European Application Serial. No. 23164394.1 dated Sep. 21, 2023, 6 pages.

* cited by examiner

FRAME FOR A TRACTION BATTERY ASSEMBLY OF A VEHICLE, TRACTION BATTERY ASSEMBLY FOR A VEHICLE, VEHICLE, AND METHOD FOR PRODUCING A FRAME FOR A TRACTION BATTERY ASSEMBLY OF A VEHICLE

CROSS-REFERENCE TO RELATED APPLICATIONS

This application claims the benefit of and priority to pending EP patent application Ser. No. 23/164,394.1, filed Mar. 27, 2023, and entitled "FRAME FOR A TRACTION BATTERY ASSEMBLY OF A VEHICLE, TRACTION BATTERY ASSEMBLY FOR A VEHICLE, VEHICLE, AND METHOD FOR PRODUCING A FRAME FOR A TRACTION BATTERY ASSEMBLY OF A VEHICLE," the entirety of which is hereby incorporated by reference herein.

TECHNICAL FIELD

The present disclosure relates to a frame for a traction battery assembly of a vehicle.

BACKGROUND

A frame for a traction battery fulfills several functionalities. First of all, the frame supports the battery cells of the traction battery assembly. Moreover, the frame protects the battery cells of the traction battery assembly. This is especially the case if the vehicle comprising the traction battery assembly is involved in a crash, for example a side crash. The frame may also serve as a structural component of the vehicle.

SUMMARY

The present disclosure relates to a frame for a traction battery assembly of a vehicle. The frame comprises at least a first beam component and a second beam component, wherein the first beam component and the second beam component are connected via a weld seam.

The present disclosure additionally relates to a traction battery assembly for a vehicle. The traction battery assembly comprises a frame.

Furthermore, the present disclosure is directed to a vehicle comprising a traction battery assembly.

Moreover, the present disclosure is directed to a method for producing a frame for a traction battery assembly of a vehicle.

The frame needs to have a certain mechanical stability.

It is an objective of the present disclosure to improve frames and battery assemblies. Especially, the mechanical stability of such frames and battery assemblies shall be enhanced.

The problem is at least partially solved or alleviated by the subject matter of the independent claims of the present disclosure, wherein further examples are incorporated in the dependent claims.

According to a first aspect, there is provided a frame for a traction battery assembly of a vehicle. The frame comprises at least a first beam component and a second beam component. The first beam component and the second beam component are connected via a weld seam. The weld seam has at least one curved section. Moreover, the weld seam is a friction stir weld seam. The fact that the weld seam is a friction stir weld seam renders the weld seam particularly stable in a mechanical sense. In other words, using friction stir welding, a high-strength weld seam can be produced. This is at least partly due to the fact that friction stir welding only generates a comparatively little heat-affected zone or no heat-affected zone at all. Moreover, friction stir weld seams have good sealing properties. This is due to the fact that friction stir welding is highly robust as far as the geometries and tolerances of the parts to be joined are concerned. Furthermore, especially as compared to other welding technologies, friction stir welding does not have the tendency to produce pores in the weld seam. Thus, if the frame is used in a traction battery assembly, the friction stir weld seam is well suitable for sealing off an interior of the traction battery assembly in order to keep undesired contaminants such as water and moisture from entering the interior of the traction battery assembly. The fact that the friction stir weld seam according to the present disclosure has at least one curved section means that the friction stir weld seam has at least one non-straight section. This allows the friction stir weld seam to be adapted to a geometry of the first beam component and/or the second beam component. Furthermore, using a weld seam with a curved section enables the use of one continuous weld seam instead of a plurality of shorter weld seams. This further enhances the sealing properties of the weld seam and the mechanical stability of the frame.

It is noted that a friction stir weld seam has a characteristic appearance such that a friction stir weld seam may be visually distinguished over other types of weld seams.

In the present disclosure, a beam component is understood as an elongated part, i.e., a part extending in three dimensions, wherein the extension in one dimension is substantially larger than the extension in the remaining two dimensions. In an example, the extension in one direction is at least ten times larger than the extension in the remaining two dimensions. The direction of the largest extension may be called a beam direction or a length direction of the beam component.

Moreover, a section of a weld seam is to be understood as a portion of one weld seam. Thus, a section of a weld seam must not be understood as a separate weld seam as such.

In an example, the curved section of the weld seam is formed as a portion of an arc of a circle.

According to a further example, the weld seam comprising the curved section may be arranged in one single plane, wherein the single plane coincides with a portion of a single planar surface of the frame, i.e., a single planar surface of the assembly comprising the first beam component and the second beam component. In this case, an orientation of the friction stir welding tool, i.e., a friction stir plunger or simply a plunger, may be kept substantially constant during the friction stir welding process. The orientation of the friction stir welding tool may be represented by an axis of rotation of the friction stir welding tool. Thus, when producing the friction stir weld seam, the friction stir welding tool is translated along the friction stir weld seam to be produced without changing the orientation of the axis of rotation.

Additionally, or alternatively, the curved section of the weld seam may connect two portions of the weld seam, wherein each portion of the weld seam is arranged on a portion of one planar surface of the frame, i.e., of the assembly comprising the first beam component and the second beam component. In this case, the planar surfaces are separate from one another, i.e., the planar surfaces do not coincide. Thus, an orientation of the friction stir welding tool, i.e., the friction stir welding plunger, needs to be modified during the friction stir welding process. The orientation of the friction stir welding tool may again be represented by an axis of rotation of the friction stir welding tool. Thus, when producing the friction stir weld seam, the friction stir welding tool is translated along the friction stir weld seam to be produced, wherein at least temporarily, an orientation of the axis of rotation is modified. In such a case, a friction stir weld seam going around a corner may be produced. As the friction stir welding tool is moved along or around an axis going beyond a two-dimensional translation in a single plane, such a friction stir welding process may be called a three-dimensional friction stir welding process.

In the context of the present disclosure, the portions of the first beam component and the second beam component which are connected via the friction stir weld seam may be of any configuration that is suitable for reliably joining the first beam component and the second beam component. For example, the portions of the first beam component and the second beam component to be connected may form a butt joint, a lap joint, a corner joint, an edge joint or a T-joint.

According to an example, the first beam component extends along a first beam direction and the second beam component extends along a second beam direction. At least a portion of the weld seam extends along a direction being perpendicular to both the first beam direction and the second beam direction. In this context, the first beam direction is to be understood as the direction of the largest extension of the first beam component. Analogously, the second beam direction is to be understood as the direction of the largest extension of the second beam component. The largest extension may also be associated with the length direction of the first beam component and the second beam component respectively. Using a weld seam that extends along the direction being perpendicular to both the first beam direction and the second beam direction allows to connect the first beam component and the second beam component in a stable manner. To this end, no intermediate parts are necessary.

In an example, at least one of the first beam component and the second beam component comprises at least one rounded edge. The weld seam crosses the at least one rounded edge. More precisely, the curved section of the weld seam crosses the at least one rounded edge. In a special case, both the first beam component and the second beam component comprise a rounded edge respectively. The rounded edge of the first beam component and the rounded edge of the second beam component may be located adjacent to one another. In all of these configurations, the curved section of the weld seam may connect two portions of the weld seam, wherein each portion of the weld seam is arranged on a portion of one planar surface of the frame, i.e., of the assembly comprising the first beam component and the second beam component. This means that one continuous weld seam may extend around a corner of the frame. Consequently, the first frame component and the second frame component are connected in a particularly stable manner. Moreover, a weld seam that extends around a corner is particularly advantageous as far as its sealing properties are concerned, since leakage in the region of the corner can be reliably avoided.

In an example, at least one of the first beam component and the second beam component comprises at least two rounded edges. The weld seam crosses the at least two rounded edges. More precisely, a first curved section of the weld seam crosses one of the at least two rounded edges and a second curved section of the weld seam crosses another one of the at least two rounded edges. In a special case, both the first beam component and the second beam component comprise two rounded edges. The rounded edges of the first beam component and the rounded edges of the second beam component are located adjacent to one another. In all of these configurations, the curved sections of the weld seam may connect three portions of the weld seam, wherein each portion of the weld seam is arranged on a portion of one planar surface of the frame, i.e., of the assembly comprising the first beam component and the second beam component. This means that one continuous weld seam may extend around two corners of the frame. Consequently, the first frame component and the second frame component are connected in a particularly stable manner. Moreover, a weld seam that extends around two corners is particularly advantageous as far as its sealing properties are concerned, since leakage in the region of the corners can be reliably avoided.

According to an example, the weld seam is a continuous weld seam. This means that the weld seam is produced in an uninterrupted manner. Moreover, the fact that the weld seam is continuous enhances the sealing properties of the weld seam.

In an example, the weld seam comprises at least two weld seam segments, wherein the at least two weld seam segments at least partially overlap. Due to the overlap, good sealing properties of the weld seam are ensured in the region where the at least two weld seam segments meet. Thus, also in such a configuration good sealing properties are provided.

In contrast to a section of a weld seam, a weld seam segment is to be understood as a comparatively small or short weld seam forming a portion of a bigger weld seam or weld seam arrangement. Thus, a weld seam segment may be considered as a weld seam as such.

In an example, the weld seam is arranged on an exterior side of the frame. In this context, all sides of the frame which are not facing other parts of the frame are considered to be exterior sides. In contrast thereto, sides of the frame which are facing other parts of the frame are considered to be interior sides of the frame. The exterior sides of the frame for example include a lateral exterior side, a top exterior side, and a bottom exterior side. The exterior sides of the frame are easily accessible by a friction stir welding tool. Consequently, the weld seam may be produced in a simple manner.

In an example, the first beam component and the second beam component are connected via an adhesive component. Thus, the first beam component and the second beam component are connected via both the friction stir weld seam and the adhesive component. Such a connection is mechanically very stable. Beyond that, the adhesive component may optionally provide a sealing functionality, such that the adhesive component also enhances the sealing properties.

In an example, the adhesive component is arranged on an interior side of the frame. As has been explained before, all sides of the frame which face other parts of the frame are considered to be interior sides. In an example in which the adhesive component is arranged on the interior side of the frame and the friction stir weld seam is arranged on the exterior side of the frame, an undesired interference of the friction stir weld seam and the adhesive component is excluded. Furthermore, also from a mechanical perspective, connecting the beam components forming the frame on the interior side and on the exterior side leads to a particularly stable frame.

In an example, one of the first beam component and the second beam component is a longitudinal beam component and one of the first beam component and the second beam component is a transversal beam component. In this context, longitudinal and transversal refer to directions of the vehicle in which the frame may be arranged. However, also in a situation in which the frame is not installed in a vehicle, a person skilled in the art is able to see which beam component of the frame is a longitudinal beam component and which beam component of the frame is a transversal beam component. Usually, the longitudinal beam component is longer than the transversal beam component.

In an example, the frame is a structural floor component of the vehicle. Thus, the frame fulfills at least two functions. The first function consists in supporting components of the traction battery assembly and protecting these components. A second function relates to providing mechanical stability to the vehicle. Using the frame as a structural floor component of the vehicle avoids double structures of the traction battery assembly in the vehicle. In this context, a traction battery assembly comprising such a frame may be called a structural battery assembly. The avoidance of double structures liberates space in the area of the floor of the vehicle. This space may for example be used for additional battery cells, thereby enhancing a driving range of the vehicle.

According to a second aspect, there is provided a traction battery assembly for a vehicle. The traction battery assembly comprises a frame according to the present disclosure and at least one battery cell being arranged inside the frame. The at least one battery cell is connected to the first beam component and/or to the second beam component via an adhesive component. Consequently, the at least one battery cell and the frame are connected in a mechanically stable manner. This has the effect that the traction battery assembly is mechanically stable and, thus, can be used as a structural battery assembly. Moreover, connecting the battery cell and the frame in a mechanically stable manner also enhances the crash resistance of the traction battery assembly.

According to a third aspect, there is provided a vehicle comprising a traction battery assembly of the present disclosure. The traction battery assembly is a structural floor component of the vehicle. As has been explained before, using the traction battery assembly as a structural floor component of avoids double structures, thereby liberating space in the area of the floor of the vehicle. This space can be used for additional battery cells, thereby enhancing the driving range of the vehicle. Alternatively, the liberated space may of course also be used for other components of the vehicle.

According to a fourth aspect, there is provided a method for producing a frame for a traction battery assembly of a vehicle. The method comprises:

- providing at least a first beam component and a second beam component, and
- connecting the first beam component and the second beam component via a friction stir weld seam having at least one curved section.

As has been explained before, a friction stir weld seam is particularly stable in a mechanical sense. In other words, using friction stir welding, a high-strength weld seam can be produced. This is at least partly due to the fact that friction stir welding only generates a comparatively little heat-affected zone or no heat-affected zone at all. Moreover, friction stir weld seams have good sealing properties. This is due to the fact that friction stir welding is highly robust as far as the geometries and tolerances of the parts to be joined are concerned. Furthermore, especially as compared to other welding technologies, friction stir welding does not have the tendency to produce pores in the weld seam. Thus, if the frame is used in a traction battery assembly, the friction stir weld seam is well suitable for tightly sealing off an interior of the traction battery assembly. The fact that the friction stir weld seam has at least one curved section means that the friction stir weld seam has at least one non-straight section. This allows the friction stir weld seam to be adapted to a geometry of the first beam component and/or the second beam component. Furthermore, using a weld seam with the curved section allows to have one continuous weld seam instead of a plurality of shorter weld seams. This further enhances the sealing properties of the weld seam and the mechanical stability of the frame.

It is noted that the frame which is produced using the method according to the present disclosure may be a frame according to the present disclosure.

In an example, the method further comprises connecting the first beam component and the second beam component via an adhesive component. Thus, the first beam component and the second beam component are connected via both the friction stir weld seam and the adhesive component. Such a connection is mechanically very stable. Beyond that, the adhesive component may optionally provide a sealing functionality, such that the adhesive component also enhances the sealing properties.

According to an example, the friction stir welding tool may be connected to an industrial robot. Using an industrial robot, the friction stir welding tool may be easily oriented in a three-dimensional space. Thus, such a configuration is particularly suitable for producing curved sections of a friction stir weld seam.

It should be noted that the above examples may be combined with each other irrespective of the aspect involved.

These and other aspects of the present disclosure will become apparent from and elucidated with reference to the examples described hereinafter.

BRIEF DESCRIPTION OF DRAWINGS

Examples of the disclosure will be described in the following with reference to the following drawings.

DETAILED DESCRIPTION

The Figures are merely schematic representations and serve only to illustrate examples of the disclosure. Identical or equivalent elements are in principle provided with the same reference signs.

Figure 1:
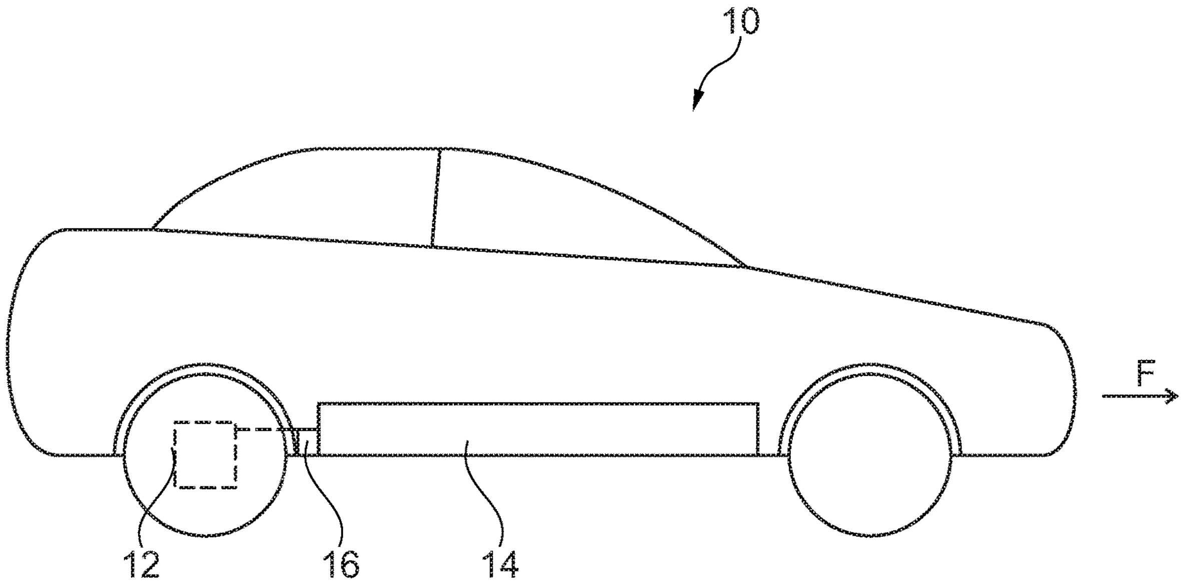
FIG. 1 shows a vehicle according to the present disclosure comprising a traction battery assembly according to the present disclosure with a frame according to the present disclosure, wherein the frame has been produced using a method according to the present disclosure.

FIG. 1 shows a vehicle 10. The vehicle 10 is an electric vehicle. Consequently, the vehicle 10 comprises an electric traction motor 12 and a traction battery assembly 14. The traction battery assembly 14 is electrically connected to the electric traction motor 12 via an inverter unit 16.

In the examples shown in the Figures, the traction battery assembly 14 is a structural floor component of the vehicle

10. This means that the traction battery assembly 14 has a structural functionality within the vehicle 10. Put otherwise, if the traction battery assembly 14 is eliminated from the vehicle 10, the structural stability of the vehicle 10 is not sufficient.

Figure 2:
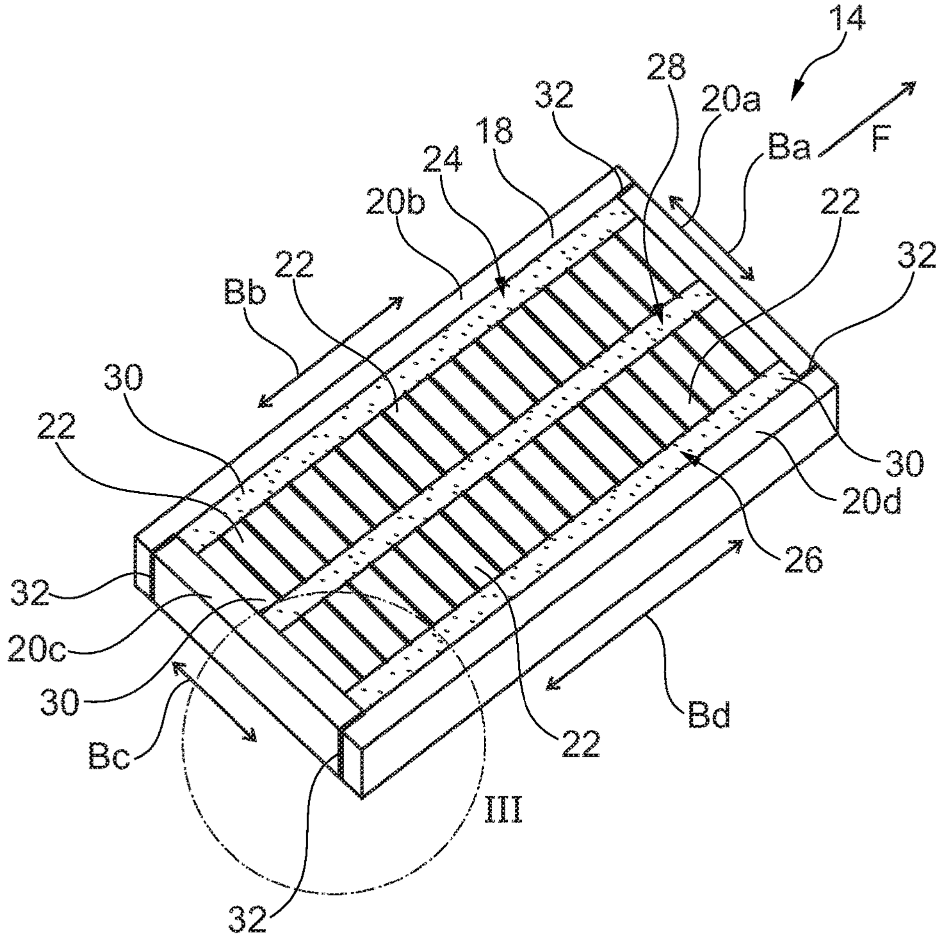
FIG. 2 shows the traction battery assembly of FIG. 1 in a separate representation.

The traction battery assembly 14 is shown in more detail in FIG. 2.

The traction battery assembly 14 comprises a frame 18 which is essentially composed of four beam components 20*a*, 20*b*, 20*c*, 20*d*. Each beam component 20*a*, 20*b*, 20*c*, 20*d* extends along a respective beam direction Ba, Bb, Bc, Bd.

The beam components 20*a*, 20*b*, 20*c*, 20*d* are arranged such that they form a rectangle. This means that the beam directions Ba, Bb, Bc, Bd are pairwise perpendicular to one another.

In the present example, the beam component 20*a* is a front transverse beam component, the beam component 20*b* is a left lateral beam component, the beam component 20*c* is a rear transverse beam component and the beam component 20*d* is a right lateral beam component.

All the above directions are provided with respect to a forward traveling direction of the vehicle 10 indicated by an arrow F.

In a space defined by an interior of the frame 18, two rows of battery cells 22 are arranged. Thus, the battery cells 22 may be considered to be arranged inside the frame 18. A stacking direction of both rows of battery cells 22 extends in parallel to the forward traveling direction F. For better visibility, only some of the battery cells 22 are provided with reference sign.

A first lateral gap 24 is provided between the beam component 20*b* and the row of battery cells 22 being arranged adjacent to the beam component 20*b*.

Moreover, a second lateral gap 26 is provided between the beam component 20*d* and the row of battery cells 22 being arranged adjacent to the beam component 20*d*.

Additionally, a central gap 28 is provided between the two rows of battery cells 22.

The first lateral gap 24, the second lateral gap 26 and the central gap 28 have an elongated form and extend in parallel to the forward traveling direction F.

Moreover, the first lateral gap 24, the second lateral gap 26 and the central gap 28 are filled with an adhesive component which is generally indicated by reference sign 30.

Consequently, each pair of the beam components out of the beam components 20*a*, 20*b*, 20*c*, 20*d* is connected via the adhesive component 30.

More precisely, the beam component 20*a* and the beam component 20*b* are connected via the adhesive component 30 which is arranged in the first lateral gap 24.

The beam component 20*b* and the beam component 20*c* are connected via the adhesive component 30 which is arranged in the first lateral gap 24.

The beam component 20*c* and the beam component 20*c* are connected by the adhesive component 30 which is arranged in the second lateral gap 26.

The beam component 20*d* and the beam component 28 are connected via the adhesive component 30 which is arranged in the second lateral gap 26.

It is noted that in all of the first lateral gap 24, the second lateral gap 26 and the central gap 28, the adhesive component 30 is arranged in an interior or at an interior side of the frame 18.

Moreover, each of the battery cells 22 being arranged in the row of battery cells 22 adjacent to the beam component 20*b* are connected to the beam component 20*b*, to the beam component 20*a* and to the beam component 20*c* via the adhesive component 30 which is arranged in the first lateral gap 24.

In the same manner, all the battery cells 22 of the row of battery cells 22 which is arranged adjacent to the beam component 20*d* are connected to the beam component 20*a* to the beam component 20*d* and to the beam component 20*c* via the adhesive component 30 which is arranged in the second lateral gap 26.

Figure 6:
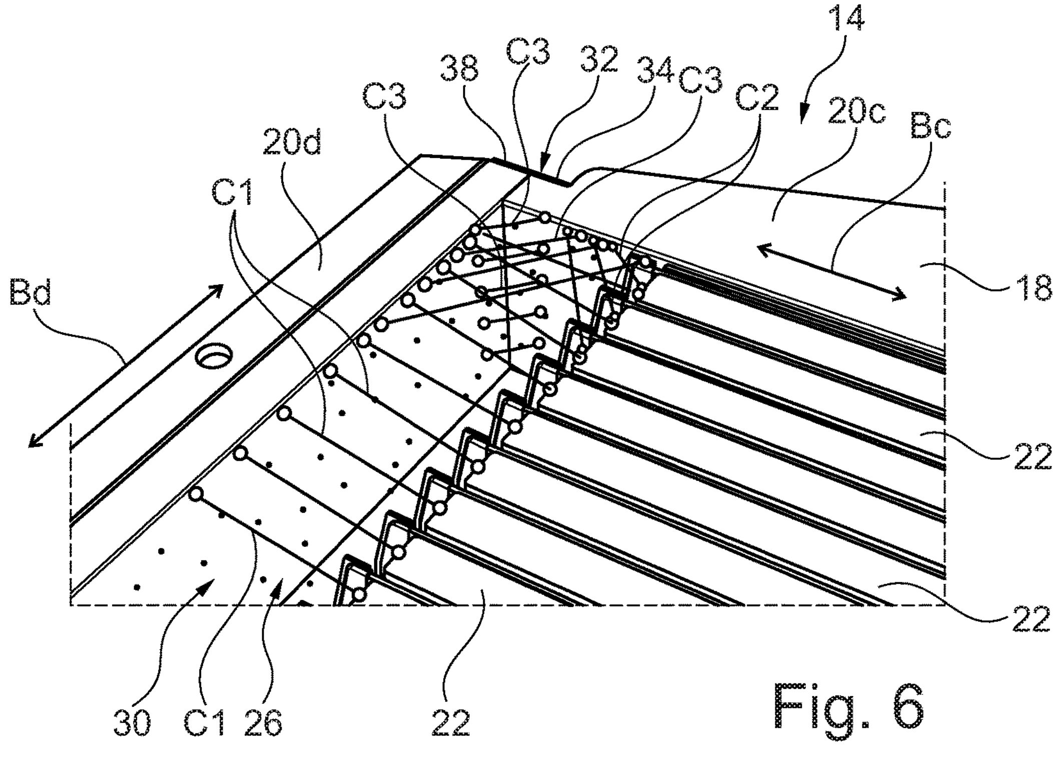
FIG. 6 shows the detail of FIG. 3 along a direction VI in FIG. 3.

FIG. 6 illustrates the different connections which are realized by the adhesive component 30 in more detail. In this context, the connection between the battery cells 22 and the beam component 20*d* are illustrated by lines C1. Connections between the battery cells 22 and the beam component 20*c* are illustrated by lines C2. Connections between the beam component 20*c* and the beam component 20*d* are illustrated by lines C3. For better visibility, only some of the lines are provided with a reference sign.

In addition to the adhesive component 30, each pair out of the beam components 20*a*, 20*b*, 20*c*, 20*d* is connected via a friction stir weld seam 32.

The friction stir weld seams 32 are arranged on an exterior side of the frame 18.

In the following, the friction stir weld seam 32 will be explained in connection with the beam component 20*c* which is the rear transverse beam component and the beam component 20*d* which is a right lateral beam component. It is understood that these explanations apply mutatis mutandis to the friction stir weld seams 32 connecting all the other pairs out of the beam components 20*a*, 20*b*, 20*c*, 20*d*.

More generally speaking, for each pair of beam components out of the beam components 20*a*, 20*b*, 20*c*, 20*d*, one beam component may be designated as a first beam component extending along a first beam direction and the other beam component may be designated as a second beam component extending along a second beam direction.

In the present example, beam component 20*c* comprises a first rounded edge 34 and a second rounded edge 36. Both rounded edges are crossed by the friction stir weld seam 32 (cf. FIG. 3).

Moreover, also the beam component 20*d* comprises a first rounded edge 38 and a second rounded edge 40. Also, the rounded edges 38, 40 of the beam component 20*d* are crossed by the friction stir weld seam 32.

Moreover, the first rounded edge 34 of the beam component 20*c* and the first rounded edge 38 of the beam component 20*c* are aligned. This means that one of the rounded edges 34, 38 is a continuation of the respective other one of the rounded edges 38.

In the same manner, the second rounded edge 36 of the beam component 20*c* and the second rounded edge 40 of the beam component 20*d* are aligned. As before, this means that one of the rounded edges 36, 40 is a continuation of the respective other one of the rounded edges.

Figure 3:
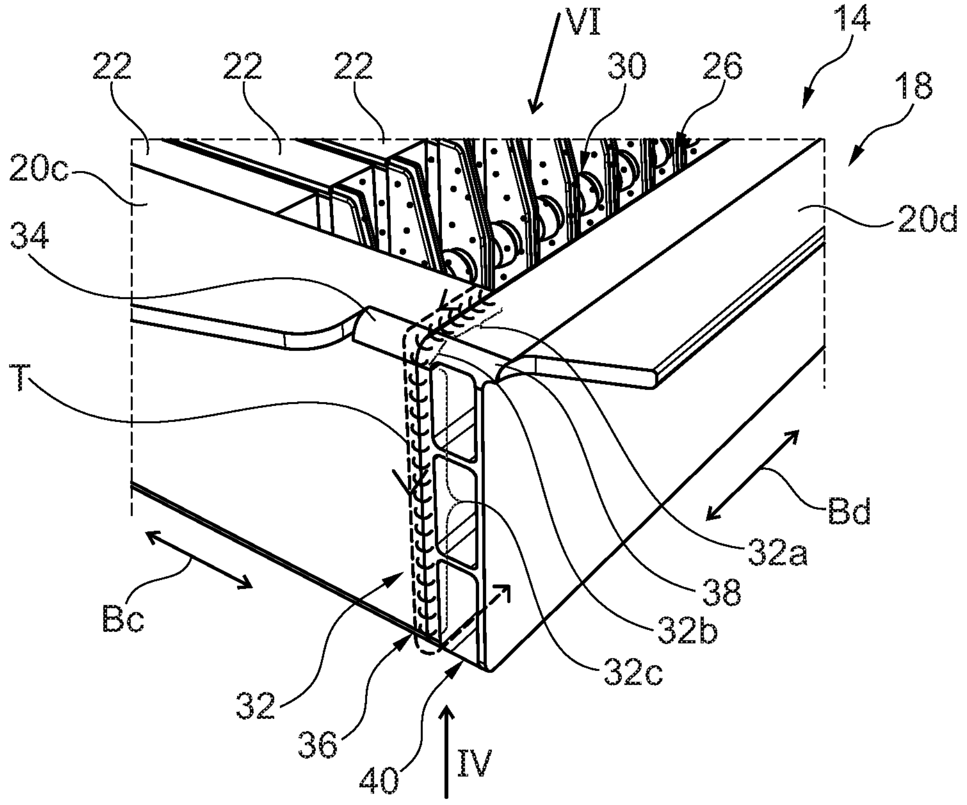
FIG. 3 shows a detail III of the traction battery assembly of FIG. 2.
Figure 4:
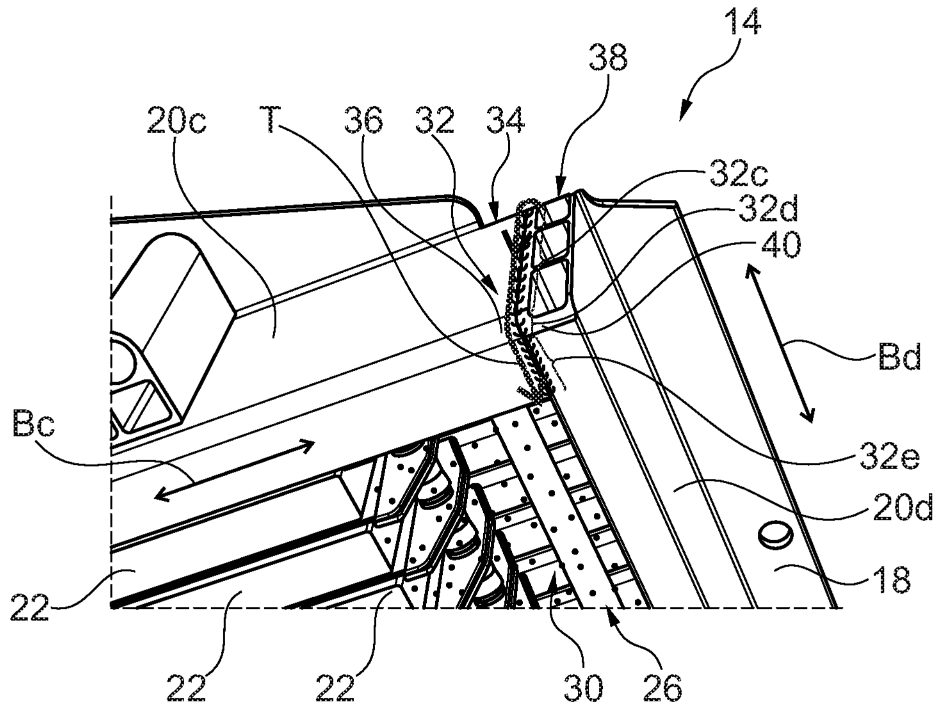
FIG. 4 shows the detail of FIG. 3 in a view along direction IV in FIG. 3.

In the example shown in FIGS. 3 and 4, the friction stir weld seam 32 is a continuous weld seam.

The friction stir weld seam 32 comprises a first straight section 32*a* which extends in parallel to a beam direction Bd of the beam component 20*d*. Adjacent to the first straight section 32*a*, the friction stir weld seam 32 comprises a first curved section 32*b* which runs around the rounded edges 34, 38.

Adjacent thereto, the friction stir weld seam 32 comprises a second straight section 32*c*. The second straight action 32*c* extends into a direction which is perpendicular to the beam direction Bd of the beam component 20*d* and also perpendicular to a beam direction Bc of the beam component 20*c*.

Adjacent thereto, the friction stir weld seam 32 comprises a second curved section 32*d* which runs around rounded edges 36, 40.

Adjacent thereto, the friction stir weld seam 32 comprises a third straight section 32*e* which extends in parallel to the beam direction Bd of the beam component 20*d*.

When installed in the vehicle 10, the first straight section 32*a* is arranged on an upper side of the frame 18 and the third straight section 32*e* is arranged at a lower side of the frame 18.

The friction stir weld seam 32 may be produced using a method for producing a frame for a traction battery assembly of a vehicle.

According to this method, in a first step, a first beam component and a second beam component are provided. In the present example, the first beam component is the beam component 20*c* and the second beam component is the beam component 20*d*.

Subsequently, in a second step, the beam component 20*c* and the beam component 20*d* are connected via the friction stir weld seam 32.

Since in the present example, the friction stir weld seam 32 is continuous and has two curved sections 32*b*, 32*d*, a friction stir welding tool, or in short, a plunger, needs to change orientation while traveling along a trajectory T being indicated by a dashed line in FIG. 3 and FIG. 4.

When producing the first straight section 32*a* of the friction stir weld seam 32, an axis of rotation of the plunger is essentially perpendicular to a top surface of the frame 18. This means that the axis of rotation extends perpendicular to the beam direction Bd of the beam component 20*d* and perpendicular to the beam direction Bc of the beam component 20*c*.

When producing the first curved section 32*b*, the orientation of the plunger is changed continuously, until the axis of rotation extends substantially in parallel to the beam direction Bd of the beam component 20*d*. In this orientation, the second straight section 32*c* is produced.

Thereafter, when manufacturing the second curved section 32*d*, the orientation of the axis of rotation of the plunger is continuously changed until the axis of rotation again extends perpendicular to the beam direction Bc of the beam component 20*c* and perpendicular to the beam direction Bd of the beam component 20*d*. However, now the orientation of the plunger is inverted with respect to the orientation that has been used for producing the first straight section 32*a* of the friction stir weld seam 32.

Additionally, in a third step, the beam component 20*c* and the beam component 20*d* are connected via the adhesive component 30 by applying the adhesive component 30 in the second lateral gap 26.

Figure 5:
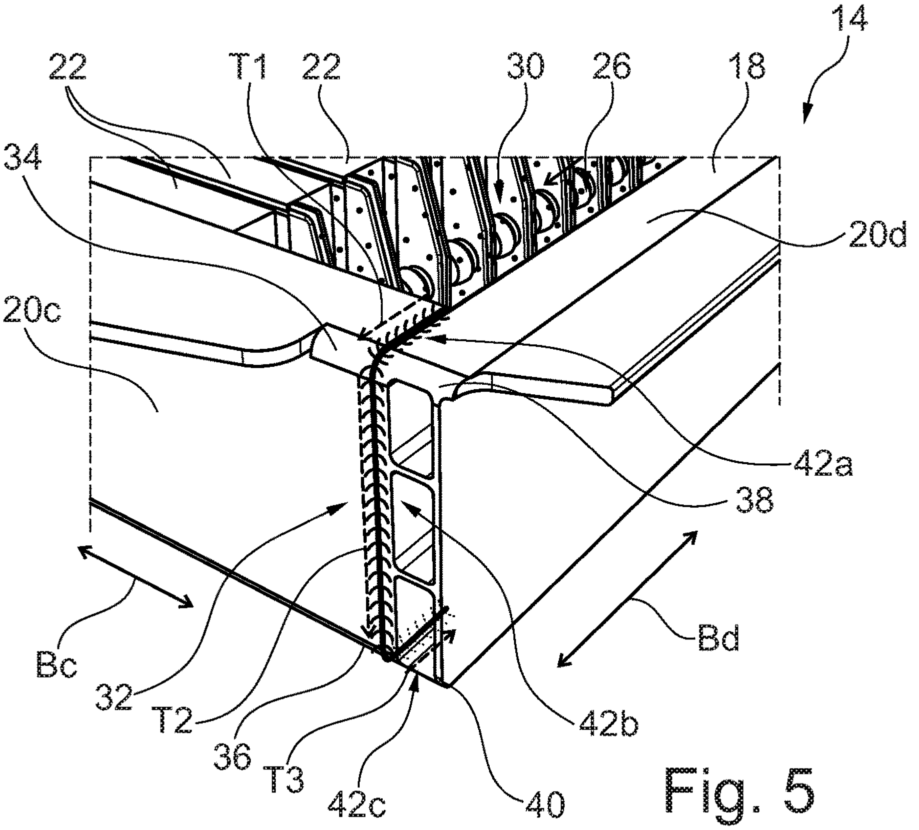
FIG. 5 shows the detail III of the traction battery assembly of FIG. 2, wherein the frame is configured in accordance with another example.

FIG. 5 shows a frame 18 according to another example. In the following, only the differences with respect to the example as shown in FIGS. 3 and 4 will be explained.

The difference relates to the friction stir weld seam 32. In the example of FIG. 5, the friction stir weld seam 32 is not continuous, but composed of three friction stir weld seam segments 42*a*, 42*b*, 42*c*.

The friction stir weld seam segments 42*a*, 42*b*, 42*c* overlap pairwise. This means that the friction stir weld seam segment 42*a* and the friction stir weld segment 42*b* overlap in the region of the first rounded edges 34, 38. The second friction stir weld seam segment 42*b* and the friction stir weld seam segment 42*c* overlap in the region of the rounded edges 36, 40.

The configuration of the friction stir weld seam 32 according to FIG. 5 also causes to differences in the method for producing the friction stir weld seam 32.

In this context, each of the friction stir weld seam segments 42*a*, 42*b*, 42*c* is produced separate from the remaining friction stir weld seam segments. This means that during production, a friction stir welding tool is abutted against the beam component 20*c* and the beam component 20*d* and withdrawn from the beam component 20*c* and the beam component 20*d* for each single one of the friction still weld seam segments 42*a*, 42*b*, 42*c*.

In order to produce weld seam segment 42*a*, the friction stir welding tool is moved along a trajectory segment T1. In order to produce weld seam segment 42*b*, the friction stir welding tool is moved along a trajectory segment T2. In order to produce weld seam segment 42*c*, the friction stir welding tool is moved along a trajectory segment T3.

Other variations to the disclosed examples can be understood and effected by those skilled in the art in practicing the claimed disclosure, from the study of the drawings, the disclosure, and the appended claims. In the claims the word "comprising" does not exclude other elements or steps and the indefinite article "a" or "an" does not exclude a plurality. The mere fact that certain measures are recited in mutually different dependent claims does not indicate that a combination of these measures cannot be used to advantage. Any reference signs in the claims should not be construed as limiting the scope of the claims.

LIST OF REFERENCE SIGNS

10 vehicle
12 electric traction motor
14 traction battery assembly
16 inverter unit
18 frame
20*a* beam component
20*b* beam component
20*c* beam component
20*d* beam component
22 battery cell
24 first lateral gap
26 second lateral gap
28 central gap
30 adhesive component
32 friction stir weld seam
32*a* first straight section
32*b* first curved section
32*c* second straight section
32*d* second curved section
32*e* third straight section
34 first rounded edge
36 second rounded edge
38 first rounded edge
40 second rounded edge
42*a* friction stir weld segment
42*b* friction stir weld segment
42*c* friction stir weld segment
Ba beam direction
Bb beam direction
Bc beam direction
Bd beam direction
C1 line illustrating an adhesive connection
C2 line illustrating an adhesive connection
C3 line illustrating an adhesive connection
F forward travelling direction of the vehicle
T trajectory for producing a friction stir weld seam T1 trajectory segment
T2 trajectory segment
T3 trajectory segment

What is claimed is:

1. A frame for a traction battery assembly of a vehicle, the frame comprising:
a first beam component; and
a second beam component,
wherein the first beam component and the second beam component are connected via a weld seam and via an adhesive component that is distinct from the weld seam, wherein the adhesive component does not comprise a weld, wherein the weld seam is arranged on an exterior side of the frame, and wherein the adhesive component is arranged on an interior side of the frame,
wherein the weld seam comprises at least one curved section, and
wherein the weld seam further comprises a friction stir weld seam.

2. The frame of claim 1, wherein the first beam component extends along a first beam direction and the second beam component extends along a second beam direction, and wherein at least a portion of the weld seam extends along a direction being perpendicular to both the first beam direction and the second beam direction.

3. The frame of claim 1, wherein at least one of the first beam component or the second beam component comprises at least one rounded edge, and wherein the weld seam crosses the at least one rounded edge.

4. The frame of claim 1, wherein at least one of the first beam component or the second beam component comprises at least two rounded edges, and wherein the weld seam crosses the at least two rounded edges.

5. The frame of claim 1, wherein the weld seam is a continuous weld seam.

6. The frame of claim 1, wherein the weld seam comprises at least two weld seam segments, and wherein the at least two weld seam segments at least partially overlap.

7. The frame of claim 1, wherein one of the first beam component or the second beam component is a longitudinal beam component and one of the first beam component or the second beam component is a transversal beam component.

8. The frame of claim 1, wherein the frame is a structural floor component of the vehicle.

9. A traction battery assembly for a vehicle, the traction battery assembly comprising:
a frame, comprising:
a first beam component;
a second beam component,
wherein the first beam component and the second beam component are connected via a weld seam and via a first adhesive component that is distinct from the weld seam, wherein the first adhesive component does not comprise a weld, wherein the weld seam is arranged on an exterior side of the frame, and wherein the first adhesive component is arranged on an interior side of the frame,
wherein the weld seam comprises at least one curved section, and
wherein the weld seam further comprises a friction stir weld seam; and
and at least one battery cell arranged inside the frame,
wherein the at least one battery cell is connected to the first beam component or the second beam component via a second adhesive component.

10. The traction battery assembly of claim 9, wherein the first beam component extends along a first beam direction and the second beam component extends along a second beam direction, and wherein at least a portion of the weld seam extends along a direction being perpendicular to both the first beam direction and the second beam direction.

11. The traction battery assembly of claim 9, wherein at least one of the first beam component or the second beam component comprises at least one rounded edge, and wherein the weld seam crosses the at least one rounded edge.

12. The traction battery assembly of claim 9, wherein at least one of the first beam component or the second beam component comprises at least two rounded edges, and wherein the weld seam crosses the at least two rounded edges.

13. The traction battery assembly of claim 9, wherein the weld seam is a continuous weld seam.

14. The traction battery assembly of claim 9, wherein the weld seam comprises at least two weld seam segments, and wherein the at least two weld seam segments at least partially overlap.

15. The traction battery assembly of claim 9, wherein the traction battery assembly is a structural floor component of the vehicle.

16. A method for producing a frame for a traction battery assembly of a vehicle, the method comprising:
providing a first beam component and a second beam component; and
connecting the first beam component and the second beam component via a friction stir weld seam comprising at least one curved section and via an adhesive component that is distinct from the friction stir weld seam, wherein the adhesive component does not comprise a weld, wherein the friction stir weld seam is arranged on an exterior side of the frame, and wherein the adhesive component is arranged on an interior side of the frame.

17. The method of claim 16, wherein the first beam component extends along a first beam direction and the second beam component extends along a second beam direction, and wherein at least a portion of the friction stir weld seam extends along a direction being perpendicular to both the first beam direction and the second beam direction.

18. The method of claim 16, wherein at least one of the first beam component or the second beam component comprises at least one rounded edge, and wherein the friction stir weld seam crosses the at least one rounded edge.

19. The method of claim 16, wherein at least one of the first beam component or the second beam component comprises at least two rounded edges, and wherein the friction stir weld seam crosses the at least two rounded edges.

20. The method of claim 16, wherein the friction stir weld seam is a continuous weld seam.

* * * * *